Sept. 22, 1931.  M. CONFORTO  1,824,594
PASTRY
Filed Jan. 29, 1930
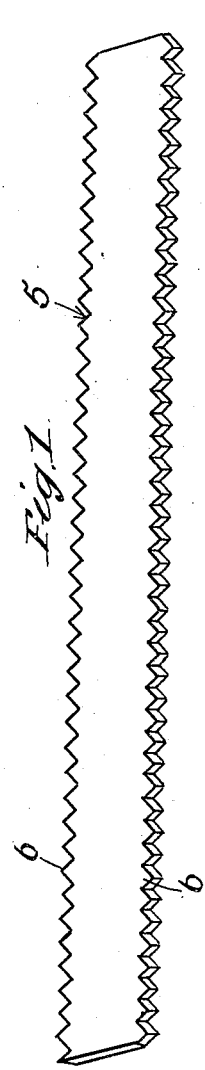
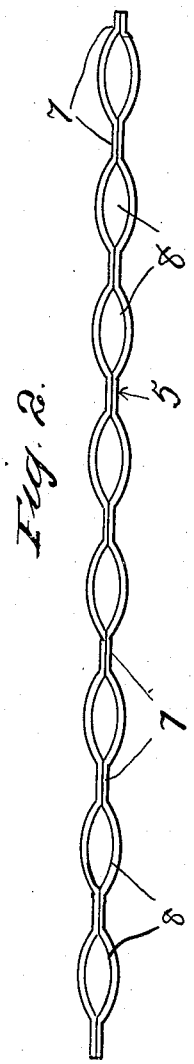
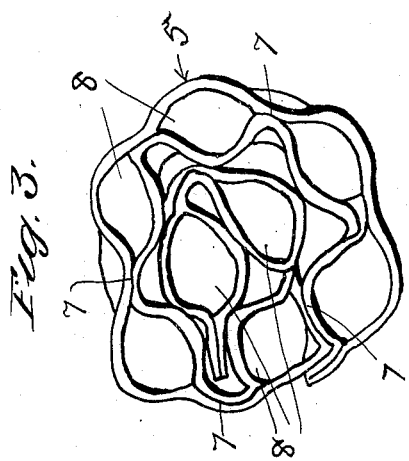
Inventor
Michael Conforto
By W.B.Williamson
Atty Patented Sept. 22, 1931

1,824,594

UNITED STATES PATENT OFFICE

MICHAEL CONFORTO, OF PHILADELPHIA, PENNSYLVANIA

PASTRY

Application filed January 29, 1930. Serial No. 424,196.

My invention relates to new and useful improvements in pastry and has for one of its objects to provide such an article having unique structural features and which is delicious and appetizing.

Another object of the invention is to provide an article of pastry and produced from a strip of dough formed in a unique fashion to provide a plurality of cavities for the reception of a substance particularly a sweet substance, such as honey.

A further object of invention is to provide an article of pastry produced from a strip of dough, the edges of which are brought together and caused to adhere to each other to produce cavities, receptacles or chambers, said chambered strip being wound about itself to form a spiral and after being cooked receiving a substance, such as honey or other preferably sweet matter.

A still further object of the invention is the production of an article of pastry by a process consisting of cutting dough into strips pinching the edges of said dough together at intervals to form receptacles or chambers, then rolling or winding said chambered dough to form a coil or spiral, then cooking said dough while submerged in oil and then applying honey or other preferably sweetened substance thereto.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawings forming a part of this application, in which:—

Fig. 1 is a perspective view of a strip of dough representing the blank from which the article of pastry is produced.

Fig. 2 is an edge view of the chambered strip produced from the strip illustrated in Fig. 1.

Fig. 3 is a plan view of the finished article.

In carrying out the invention as herein embodied, I first make a dough from two pounds of flour, one dozen eggs, ten fluid drams of vanilla and two tablespoonfuls of baking powder. The eggs are first well beaten and then mixed with the flour and baking powder to which is afterwards added the vanilla. The dough thus produced is set aside for about fifteen minutes.

When ready to make the articles of pastry, the dough is flattened in any suitable manner as by a rolling pin to a thickness of approximately one-sixteenth of an inch and is then cut into strips about one inch wide and eight inches long, such a strip being indicated by the numeral 5 in Fig. 1, and if found desirable, longer edges of said strips may be serrated as indicated at 6.

Each strip of dough thus provided has the longer edges turned toward each other and pinched together at intervals with sufficient force to cause said edges to adhere as indicated at 7 and the points where the edges of the dough are brought together include the corners of the dough strip thereby providing a plurality of spaced chambers or receptacles 8, as shown in Fig. 2.

The chambered strip thus produced is then wound upon itself from one end to the other in the form of a coil or spiral so as to produce the article of pastry 9 illustrated in Fig. 3, and said article of pastry is finished by cooking it submerged in oil and applying honey or preferably sweet substance thereto especially so that some of the substance will be held in the chambers or receptacles.

While I have given what I believe to be the most desirable dimensions for cutting the dough strips, it is to be understood that such dimensions may be varied when it is desirable to make an article of pastry of another size.

Of course I do not wish to be limited to the exact details of construction as herein shown, as these may be varied within the limits of the appended claim without departing from the spirit of my invention.

Having thus fully described my invention, what I claim as new and useful is:—

The process of producing an article of pastry which consists of making a dough, flattening the same, cutting said dough into strips, bringing the edges together at intervals to provide spaced chambers, then winding said chambered strip from one end to the other to form a coil, then cooking said coil in oil and finally applying honey to said coil.

In testimony whereof, I have hereunto affixed my signature.

MICHAEL CONFORTO.